Patented Sept. 6, 1938

2,129,166

UNITED STATES PATENT OFFICE 2,129,166

PURIFICATION OF MALEIC ANHYDRIDE

Joyce H. Crowell, Buffalo, N. Y., assignor to National Aniline & Chemical Company, Inc., New York, N. Y., a corporation of New York No Drawing. Application January 6, 1936,
Serial No. 57,782

11 Claims. (Cl. 260—343)

This invention relates to the purification of maleic anhydride (the anhydride of maleic acid). It relates especially to the purification of crude or partially purified maleic anhydride containing colored impurities and resulting from the catalytic partial oxidation of organic substances in the vapor phase (hereinafter called "catalytic maleic anhydride").

Processes are known to the art for the catalytic air oxidation of organic substances in the vapor phase resulting in the production of maleic anhydride. Thus, it is well known that maleic anhydride can be produced as a main or subsidiary product by the vapor phase catalytic oxidation of benzene, toluene, xylene, naphthalene, their derivatives, and other organic substances in contact with a catalyst maintained at an elevated temperature in the presence of a gas containing free oxygen, e. g., atmospheric air. As generally practiced in the art, the maleic anhydride present in the reaction products is recovered as the acid or as the anhydride.

In the direct recovery of maleic anhydride in the form of the anhydride from the gaseous reaction mixtures resulting from catalytic oxidation of organic compounds in the vapor phase, an advantageous procedure involves absorbing the maleic anhydride from the gaseous reaction mixture in a non-aqueous liquid which is a solvent for maleic anhydride, and then recovering the maleic anhydride from the solvent, for example by crystallization, distillation, etc.

The maleic anhydride obtained by such procedures is generally contaminated by impurities, the maleic anhydride frequently being highly colored from yellow to brown. In many cases a purification of the maleic anhydride may be effected by distilling it, preferably at sub-atmospheric pressure and preferably while rectifying the vapors, and separately collecting a middle fraction of distillate. Such distillation, even if carried out with efficient fractionation, fails, however, to remove the color to a satisfactory degree, although it may remove part of the color and otherwise increase the purity of the maleic anhydride. A colored maleic anhydride is unsuitable for many purposes for which white maleic anhydride can be employed. In some cases a maleic anhydride which is otherwise of high purity is not acceptable because of immeasurable amounts of color-imparting impurities contained therein.

It has heretofore been proposed to purify maleic anhydride by crystallizing and recrystallizing it from a solvent; as for example ether, solvent naphtha and the like. Such processes, however, require extensive equipment for storing and handling the solutions and mother liquors and for recovering solvents, and they consume considerable time for the crystallizations.

The principal object of the present invention is to provide a simple and efficient method for the purification and/or decolorization of maleic anhydride and especially maleic anhydride resulting from catalytic oxidation of organic compounds in the vapor phase.

Other objects of the invention will in part be obvious and will in part appear hereinafter.

I have found, as one feature of my invention, that the impurities which are responsible for the undesired color of maleic anhydride, and especially of maleic anhydride produced by catalytic oxidation of organic compounds in the vapor phase (catalytic maleic anhydride), can be converted to by-products whose volatility differs substantially from that of maleic anhydride by subjecting maleic anhydride containing such impurities to a heat treatment. Without limiting the invention to any specific theoretical explanations, it appears the action of heat on the said impurities in the presence of maleic anhydride effects a chemical condensation or other reaction of the color-imparting impurities with themselves and/or with other impurities and/or with maleic anhydride, to form the said by-products. In general, these by-products are much less volatile than maleic anhydride and can be separated therefrom by fractional vaporization or by vaporization and fractional condensation. Thus, I have found, when catalytic maleic anhydride is maintained at an elevated temperature for a considerable period of time correlated to the temperature, followed by distillation and fractionation, that a distillate of substantially pure maleic anhydride can be obtained which may be separately collected, and that fumaric acid and other decomposition products of maleic acid are formed if at all only to a relatively small extent.

I have furthermore found, as another feature of my invention, that the purification of catalytic maleic anhydride can be effected as a step in the process of recovering it from gaseous mixtures resulting from the catalytic oxidation of organic compounds, and accordingly that the catalytic production of purified maleic anhydride can be considerably simplified. Thus, I have found that a relatively pure maleic anhydride can be produced with a high yield by subjecting a catalytic maleic anhydride which has been condensed or absorbed in a water-immiscible organic liquid solvent therefor to the heat treatment while still contained in the resulting solution, or after recovery from the resulting solution by crystallization followed by separation of the crystals from the mother liquor or by a preliminary removal of the solvent by distillation or by a combination of said procedures.

The invention accordingly comprises the steps and the relation of each with others thereof which will be exemplified in the process hereinafter disclosed. The scope of the invention will be indicated in the appended patent claims.

In the practice of the present invention in accordance with one mode of procedure, maleic anhydride containing impurities which impart color thereto, more particularly catalytic maleic anhydride, and especially catalytic maleic anhydride which has been recovered as such from a gaseous reaction mixture, is purified by heating or maintaining it at an elevated temperature for a period of time sufficient to convert said impurities to by-products whose volatility differs substantially from that of maleic anhydride, and maleic anhydride is separated and collected in a form free from said by-products.

The treated maleic anhydride may be separated from the by-products resulting from the heat treatment by any suitable vaporization procedure, as for example by distillation, sublimation, etc. It is preferably subjected to fractional distillation, the purified maleic anhydride being recovered as a separate fraction of distillate. Distillation of the maleic anhydride, when carried out in connection with the purification process of the present invention, may be at atmospheric pressure or at sub-atmospheric pressure. Sub-atmospheric pressure is preferably employed in order to permit distillation at a lower temperature and thereby reduce decomposition.

The elevated temperature at which the impure maleic anhydride is maintained to effect the desired conversion of the impurities falls within wide limits. In the commercial practice of the invention, the minimum temperature ordinarily employed is about 130° C. and the maximum temperature ordinarily employed is about the boiling point of maleic anhydride at atmospheric pressure (about 200° C.). While temperatures below 130° C. may be employed, the rate of reaction at such temperatures is not sufficiently rapid for ordinary commercial operation. Further, temperatures higher than the boiling point of maleic anhydride at atmospheric pressure also may be employed with corresponding decrease in the required period of heating, but in that event superatmospheric pressures and apparatus adapted thereto or other expedients are required.

The duration of the heat treatment and the temperature thereof are interrelated (a longer period of heating being required with a lower temperature and vice versa) and are in turn dependent upon the degree of impurity of the maleic anhydride. Thus, in the treatment of a maleic anhydride recovered as such from the gaseous reaction mixture resulting from the vapor-phase catalytic air oxidation of benzene, a heating time of about 2 to about 4 days is required at temperatures in the neighborhood of 130° C. to effect substantially complete conversion of the impurities to by-products of sufficiently different volatility from that of maleic anhydride to render them separable by distillation. On the other hand, temperatures as high as the boiling point of maleic anhydride at atmospheric pressure (about 200° C.) require a much shorter period of heating, in many cases a heating time of about 2 to about 10 hours being sufficient.

A convenient method of securing the desired purification comprises maintaining a body of the impure maleic anhydride at a temperature of about 150° to about 170° C. for a period of about 24 hours to about 48 hours, depending upon the particular crude maleic anhydride being treated, then subjecting the resulting maleic anhydride to fractional distillation, preferably under sub-atmospheric pressure conditions, for example, an absolute pressure of less than about ten inches of mercury, and collecting purified maleic anhydride as a separate fraction of condensate. The product of the distillation may be collected in various ways; for example, it may be run into trays or drums, allowed to cool, and broken up into pieces of suitable size; or it may be permitted to cool while being subjected to a flaking or shot-forming process and thereby recovered in the form of flakes, granules or a shot-like form.

When the maleic anhydride has been produced by the catalytic oxidation of an organic substance in the vapor phase followed by recovery of the maleic anhydride by absorption in a water-immiscible organic solvent, the maleic anhydride need not be separated from the resulting solution of maleic anhydride in the solvent, but the solution may be subjected to the heat treatment and the treated maleic anhydride may then be recovered in any suitable manner. A convenient method of procedure in such cases comprises heat treatment of the solution followed by fractional distillation of the heat treated solution to remove the absorbent and recover the purified maleic anhydride as separate fractions of distillate. If the solvent employed in such a procedure has a boiling point at atmospheric pressure at or below the temperature of the desired heat treatment, the heat treatment may be carried out under reflux or at suitable superatmospheric pressure conditions. It will be evident, however, that the maleic anhydride may be first separated from the solvent (as by crystallization or distillation), and then subjected to the purification treatment in accordance with the present invention if desired.

For purposes of illustration, the invention will be further described in connection with the direct recovery of maleic anhydride from the gaseous reaction mixtures resulting from the catalytic air oxidation of benzene. It will be evident from the foregoing, however, that the process is not limited thereto and may be employed for the purification of maleic anhydride resulting from the partial oxidation or decomposition of vapors of other organic materials in the presence of a catalyst, and particularly maleic anhydride recovered in the anhydride form as a reaction product of the catalytic air oxidation of an organic compound in the vapor phase.

A mixture of benzene vapors and air is passed through an enclosed space (such as a so-called converter tube) containing a contact mass or catalyst under conditions suitable for the production of maleic anhydride whereby there is produced a reaction mixture containing maleic anhydride, water vapor, nitrogen, carbon monoxide, carbon dioxide and other products of combustion. The maleic anhydride is recovered from the reaction mixture by condensing it while avoiding substantial condensation of water vapor, i. e., while maintaining the conditions such that water vapor is retained in the gas mixture. The condensation of the maleic anhydride is preferably effected by absorbing it in a water-immiscible substance which is liquid under the conditions of the treatment, while maintaining a temperature adapted to prevent substantial condensation of water, until the absorbent has taken up maleic anhydride to the desired extent. The solution is then subjected to the heat treatment as such, or the maleic anhydride is first separated from the solution and then subjected to the heat treatment. Thus, the solution resulting from the absorption of catalytic maleic anhydride in a water-immiscible organic solvent having a boiling point at atmospheric pressure of about 100° to about 160° C. may be fractionally distilled so as to first remove a vapor fraction containing said organic liquid, together with volatile impurities and a small amount of maleic anhydride, and then may be treated in the manner herein described.

The absorbent may be any suitable water-immiscible substance which is liquid under the conditions of the treatment. It is preferably an organic compound which is relatively inert with respect to the reaction mixture and in which maleic anhydride is soluble. The liquid may have a relatively high vapor pressure or a relatively low vapor pressure; and liquids which boil at a relatively low temperature, for example, below 100° C. may be used as well as those which boil at higher temperatures. When a liquid is employed which has a relatively low boiling point and/or a relatively high vapor pressure, the absorption may be carried out under superatmospheric pressure so as to minimize the loss of the absorbent carried out as vapor by the effluent gases, particularly at elevated absorption temperatures, as well as to increase the efficiency of the absorption. The absorption may be carried out at atmospheric pressure, however, if desired.

Among the absorbents which are useful in the process there may be mentioned, by way of example, liquid hydrocarbons of the aliphatic and aromatic series, ethers, aromatic nitro-compounds, halogenated hydrocarbons of the aliphatic and aromatic series, halogenated hydrogenated aromatic hydrocarbons, etc., and mixtures thereof; as for example, benzene, toluene, solvent naphtha, petroleum ether, gasolene, heavy solvent, diphenyl, nitrobenzene, nitrotoluene, mixtures of nitrotoluenes, diphenyloxide, chloroform, carbon tetrachloride, chlorobenzenes, chloronaphthalenes, etc.

As illustrative embodiments of a manner in which the invention may be practiced, the following examples are presented. The invention is not limited thereto, however, and various changes may be made in the materials employed and in the method and details of procedure without departing from the scope of the invention as defined in the appended patent claims. The temperatures are in degrees centigrade.

Example 1

A solution of impure maleic anhydride in solvent naphtha (obtained by removing maleic anhydride by absorption in solvent naphtha from the gaseous reaction mixture resulting from the catalytic air oxidation of benzene vapor) was maintained at a temperature between 130° and 140° for about 60 hours. Following this heat treatment, the solution of maleic anhydride in solvent naphtha was introduced into a jacketed still connected with a fractionating column and a vacuum pump. Saturated steam at a pressure of about 150 lbs. was supplied to the jacket of the still. The solution was distilled under an absolute pressure of about 10 inches of mercury until the vapors at the head of the rectifying column reached a temperature of about 155° and indicated that all but a small amount of solvent naphtha had been removed from the still. The absolute pressure in the still was then lowered to about 6 inches of mercury, and the distillation was continued, to remove the remaining solvent naphtha in the still. At this stage, the vapors comprised mixtures of solvent naphtha and maleic anhydride, in which the contents of the anhydride increased very rapidly.

When a sample of the condensate, taken as it left the condenser, had a setting point of about 52°, which indicated that the distillate was substantially pure maleic anhydride, the condensate was diverted to a separate receiver. The distillation was continued until the charge in the still was exhausted, and a heel of higher boiling impurities remained. The separately collected condensate of purified maleic anhydride was characterized by a high degree of purity. It was tinged with a very faint yellow color, which had approximately 1.7 per cent of the intensity of the orange color of a corresponding fraction of maleic anhydride obtained by distilling a portion of the same solvent-naphtha solution of maleic anhydride in the same manner but without the preliminary heat treatment. The small amount of residue which remains in the still may be removed in any suitable manner, as by washing it out with hot water or a hot dilute aqueous solution of alkali.

Example 2

*Part A.*—A solution of impure maleic anhydride in solvent naphtha, similar to that employed in Example 1, was subjected to fractional distillation at an absolute pressure of about 10 inches of mercury until substantially all solvent naphtha was removed.

*Part B.*—The maleic anhydride, from which the solvent had been removed in accordance with the procedure of Part A, was maintained at a temperature between 150° and 160° for 2 days and then subjected to fractional distillation at an absolute pressure of about 10 inches of mercury. A main fraction of distillate consisting of substantially colorless maleic anhydride was obtained. The product of Part A, when further fractionally distilled at an absolute pressure of about 10 inches of mercury, without the intermediate heat treatment, resulted in a maleic anhydride having an orange color.

Example 3

Maleic anhydride obtained in accordance with the procedure of Example 2, Part A, was refluxed at its boiling point (about 200°) at atmospheric pressure for an hour and three-fourths. The resulting mass was subjected to fractional distillation at an absolute pressure of about 6 inches of mercury. A substantially colorless maleic anhydride, similar to the product of Example 2, was obtained as the main fraction of distillate.

It will be realized by those skilled in the art that the invention is not limited to the foregoing examples but that changes may be made without departing from the scope of the invention.

The purification of maleic anhydride in accordance with the present invention may be applied to impure or colored maleic anhydride, and especially impure or colored catalytic maleic anhydride, obtained from various sources (as for example, the products of the catalytic air oxidation of vapors of benzene, toluene, xylene or naphthalene for the production of maleic anhydride; the residual gaseous mixtures resulting from the catalytic air oxidation of naphthalene for the production of phthalic anhydride, followed by recovery of phthalic anhydride from the gaseous products; and the like) and in various forms (e. g., in the solid form or in the form of solutions in solvents) as well as to that produced in various ways (e. g., by crystallization from its solutions, by distillation or sublimation of crude maleic anhydride, or by dehydration of maleic acid).

In the claims, it will be understood that the term "catalytic maleic anhydride" refers to and is limited to a maleic anhydride which has been prepared by the partial or selective oxidation of an organic compound, such as benzene, in the vapor phase mixed with oxygen or an oxygen-containing gas in contact with a suitable catalyst; and that the term "maleic anhydride yielding substance" refers to and is limited to a substance which results in maleic anhydride when subjected to selective or partial oxidation in the vapor phase in admixture with oxygen or an oxygen-containing gas in contact with a suitable catalyst.

I claim:

1. A method of purifying catalytic maleic anhydride containing impurities which impart color thereto, which comprises maintaining the impure maleic anhydride at a temperature between about 130° and about 200° C. for a period of time at least sufficient to convert said impurities to by-products whose volatility is substantially different from that of maleic anhydride, said period of heating being at least 1¾ hours, and separating maleic anhydride from the resulting by-products by vaporization.

2. A method of purifying catalytic maleic anhydride containing impurities which impart color thereto, which comprises maintaining the impure maleic anhydride at a temperature between about 130° and about 200° C. for a period of time at least sufficient to convert said impurities to by-products whose volatility is substantially different from that of maleic anhydride, said period of heating being at least 1¾ hours, fractionally distilling the resulting maleic anhydride, condensing the distillate, and separately collecting a condensate of purified maleic anhydride.

3. A method of purifying catalytic maleic anhydride containing impurities which impart color thereto, which comprises maintaining the impure maleic anhydride at a temperature of about 130° to about 200° C. for a substantial period of time, said period of time being at least about 2 hours at about 200° C. and longer at lower temperatures, and separating maleic anhydride from the resulting mixture by vaporization.

4. A method of purifying catalytic maleic anhydride containing impurities which impart color thereto, which comprises maintaining the impure maleic anhydride at a temperature of about 130° to about 170° C. for about 24 hours to about 96 hours, and separating maleic anhydride from the resulting mixture by vaporization.

5. A method of purifying catalytic maleic anhydride containing impurities which impart color thereto, which comprises heating the impure maleic anhydride at a temperature of about 150° to about 170° C. for about 24 hours to about 48 hours, to convert said impurities to products whose volatility is substantially different from that of maleic anhydride, distilling the resulting maleic anhydride, rectifying the vapors, and condensing and collecting a distillate of purified maleic anhydride.

6. A method of purifying catalytic maleic anhydride containing impurities which impart color thereto, which comprises maintaining the impure maleic anhydride at a temperature of about 200° C. for about 2 hours to about 10 hours, to convert said impurities to products whose volatility is substantially different from that of maleic anhydride, and separating maleic anhydride from the resulting mixture by vaporization.

7. In the production of maleic anhydride by a process which comprises passing a mixture of air and vapors of a maleic anhydride yielding substance in contact with an oxidation catalyst under conditions adapted to produce maleic anhydride, condensing the resulting maleic anhydride in contact with a water-immiscible organic liquid which is a solvent for said maleic anhydride while retaining the water vapor in the gas mixture, whereby a solution of maleic anhydride in said water-immiscible organic liquid is obtained, the improvement which comprises maintaining the resulting solution of maleic anhydride at a temperature between about 130° and about 200° C. for a period of time at least sufficient to convert said impurities to by-products whose volatility is substantially different from that of maleic anhydride, said period of heating being at least 1¾ hours, and separating maleic anhydride from the resulting product by a process including vaporization of the maleic anhydride.

8. In the production of maleic anhydride by a process which comprises passing a mixture of air and benzene vapors in contact with an oxidation catalyst under conditions adapted to produce maleic anhydride, and absorbing maleic anhydride from the resulting gaseous mixture in solvent naphtha, whereby a solution of maleic anhydride in solvent naphtha is obtained, the improvement which comprises maintaining the solution at a temperature of about 130° to about 140° C. for about 24 to about 60 hours, fractionally distilling the resulting solution, and separately collecting maleic anhydride in a purified condition as a condensate.

9. A method of purifying catalytic maleic anhydride containing impurities which impart color thereto and obtained by a process comprising passing a mixture of air and vapors of a maleic anhydride yielding substance in contact with an oxidation catalyst under conditions adapted to produce maleic anhydride, condensing the resulting maleic anhydride in contact with a water-immiscible organic liquid which is a solvent for said maleic anhydride while retaining the water vapor in the gas mixture to obtain a solution of maleic anhydride in said water-immiscible organic liquid, and separating maleic anhydride from the resulting solution by distillation, which comprises maintaining the maleic anhydride at a temperature of about 130° to about 170° C. for about 24 hours to about 96 hours to convert said impurities to by-products whose volatility is substantially different from that of maleic anhydride, then fractionally distilling the maleic anhydride, and condensing and collecting maleic anhydride in a purified condition as a condensate.

10. A method of purifying catalytic maleic anhydride containing impurities which impart color thereto and obtained by a process comprising passing a mixture of air and benzene vapors in contact with an oxidation catalyst under conditions adapted to produce maleic anhydride, condensing the resulting maleic anhydride in contact with a water-immiscible organic liquid which is a solvent for said maleic anhydride while retaining the water vapor in the gas mixture to obtain a solution of maleic anhydride in said water-immiscible organic liquid, and distilling the resulting solution to remove the said organic liquid from the maleic anhydride, which comprises maintaining the maleic anhydride at a temperature of about 130° to about 170° C. for about 24 hours to about 96 hours, to convert said impurities to by-products whose volatility is substantially different from that of maleic anhydride, distilling the resulting maleic anhydride, rectifying the vapors, and condensing and collecting a distillate of purified maleic anhydride.

11. A method of purifying catalytic maleic anhydride containing impurities which impart color thereto and obtained by a process comprising passing a mixture of air and benzene vapors in contact with an oxidation catalyst under conditions adapted to produce maleic anhydride, absorbing maleic anhydride from the resulting gaseous mixture in solvent naphtha to obtain a solution of maleic anhydride in solvent naphtha, and distilling the solution at a subatmospheric pressure to remove the solvent naphtha, which comprises heating the maleic anhydride at a temperature of about 150° to about 170° C. for about 24 hours to about 48 hours, then distilling the maleic anhydride at a subatmospheric pressure, and separately collecting maleic anhydride in a purified condition.

JOYCE H. CROWELL.